United States Patent
Nagasawa et al.

(10) Patent No.: US 11,138,994 B2
(45) Date of Patent: Oct. 5, 2021

(54) MAGNETIC HEAD AND MAGNETIC RECORDING DEVICE HAVING MAGNETIC LAYERS AND NON-MAGNETIC LAYERS BETWEEN SHIELD AND MAGNETIC POLE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Tazumi Nagasawa, Yokohama Kanagawa (JP); Naoyuki Narita, Funabashi Chiba (JP); Hirofumi Suto, Ota Tokyo (JP); Masayuki Takagishi, Kunitachi Tokyo (JP); Tomoyuki Maeda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 20 days.

(21) Appl. No.: 16/565,749

(22) Filed: Sep. 10, 2019

(65) Prior Publication Data
US 2020/0294537 A1 Sep. 17, 2020

(30) Foreign Application Priority Data
Mar. 11, 2019 (JP) ............................. JP2019-043930

(51) Int. Cl.
*G11B 5/235* (2006.01)
*G11B 5/31* (2006.01)
(Continued)

(52) U.S. Cl.
CPC ............ *G11B 5/235* (2013.01); *G11B 5/1278* (2013.01); *G11B 5/314* (2013.01); *G11B 5/3146* (2013.01);
(Continued)

(58) Field of Classification Search
None
See application file for complete search history.

(56) References Cited

U.S. PATENT DOCUMENTS 9,064,508 B1 * 6/2015 Shiimoto et al. ...... G11B 5/235
2008/0268291 A1 * 10/2008 Akiyama et al. ...... G11B 5/314
428/812

(Continued)

FOREIGN PATENT DOCUMENTS

JP          2019-57338 A    4/2019

*Primary Examiner* — Craig A. Renner
(74) *Attorney, Agent, or Firm* — Finnegan, Henderson, Farabow, Garrett & Dunner L.L.P

(57) ABSTRACT

According to one embodiment, a magnetic head includes a shield, a magnetic pole, a first magnetic layer provided between the shield and the magnetic pole, a second magnetic layer provided between the first magnetic layer and the magnetic pole, a third magnetic layer provided between the second magnetic layer and the magnetic pole, a first nonmagnetic layer provided between the shield and the first magnetic layer, a second nonmagnetic layer provided between the first magnetic layer and the second magnetic layer, a third nonmagnetic layer provided between the second magnetic layer and the third magnetic layer, and a fourth nonmagnetic layer provided between the third magnetic layer and the magnetic pole. The first and third nonmagnetic layers include one of Cu, Ag, Au, Al, and Ti. The second and fourth nonmagnetic layers include one of Ta, Pt, Ir, W, Mo, Cr, Tb, Rh, Pd, and Ru.

7 Claims, 8 Drawing Sheets

(51) Int. Cl.
   *G11B 5/127*   (2006.01)
   *G11B 5/193*   (2006.01)
   *G11B 5/00*   (2006.01)

(52) U.S. Cl.
   CPC ...... *G11B 5/193* (2013.01); *G11B 2005/0024* (2013.01)

(56) References Cited

U.S. PATENT DOCUMENTS

| | | | |
|---|---|---|---|
| 2012/0126905 A1* | 5/2012 | Zhang et al. | G11B 5/3146 427/130 |
| 2013/0271866 A1* | 10/2013 | Sato | G11B 5/3146 360/125.01 |
| 2015/0228295 A1 | 8/2015 | Shiimoto et al. | |
| 2019/0088275 A1 | 3/2019 | Narita et al. | |

* cited by examiner

MAGNETIC HEAD AND MAGNETIC RECORDING DEVICE HAVING MAGNETIC LAYERS AND NON-MAGNETIC LAYERS BETWEEN SHIELD AND MAGNETIC POLE

CROSS-REFERENCE TO RELATED APPLICATIONS

This application is based upon and claims the benefit of priority from Japanese Patent Application No. 2019-043930, filed on Mar. 11, 2019; the entire contents of which are incorporated herein by reference.

FIELD

Embodiments described herein relate generally to a magnetic head and a magnetic recording device.

BACKGROUND

Information is recorded in a magnetic recording medium such as a HDD (Hard Disk Drive) or the like by using a magnetic head. It is desirable to increase the recording density of the magnetic head and the magnetic recording device.

DETAILED DESCRIPTION

Figure 1:
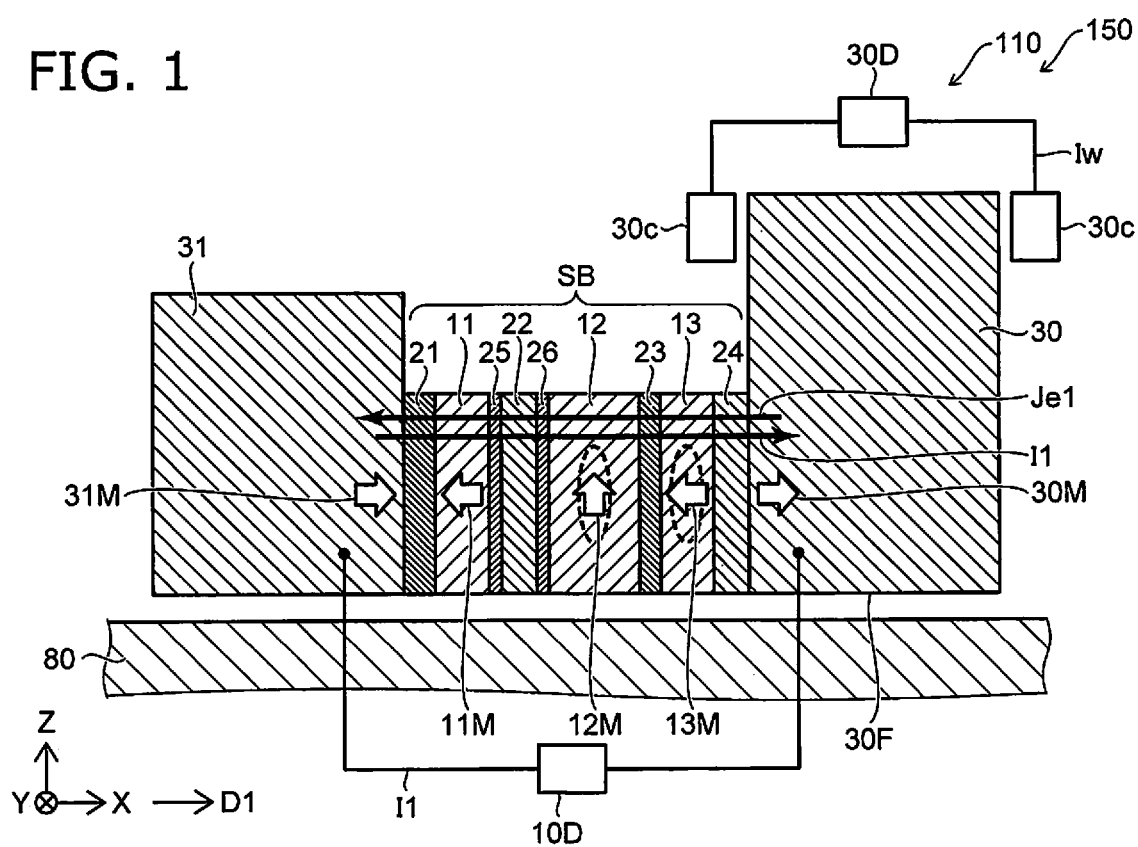
FIG. 1 is a schematic cross-sectional view illustrating a magnetic head and a magnetic recording device according to a first embodiment.

According to one embodiment, a magnetic head includes a shield, a magnetic pole, a first magnetic layer provided between the shield and the magnetic pole, a second magnetic layer provided between the first magnetic layer and the magnetic pole, a third magnetic layer provided between the second magnetic layer and the magnetic pole, a first nonmagnetic layer provided between the shield and the first magnetic layer, a second nonmagnetic layer provided between the first magnetic layer and the second magnetic layer, a third nonmagnetic layer provided between the second magnetic layer and the third magnetic layer, and a fourth nonmagnetic layer provided between the third magnetic layer and the magnetic pole. The first nonmagnetic layer and the third nonmagnetic layer include at least one selected from the group consisting of Cu, Ag, Au, Al, and Ti. The second nonmagnetic layer and the fourth nonmagnetic layer include at least one selected from the group consisting of Ta, Pt, Ir, W, Mo, Cr, Tb, Rh, Pd, and Ru. Thicknesses along a first direction of the second nonmagnetic layer and the fourth nonmagnetic layer each are not less than 1 nm and not more than 3 nm. The first direction is from the shield toward the magnetic pole.

According to another embodiment, a magnetic head includes a shield, a magnetic pole, a first magnetic layer provided between the shield and the magnetic pole, a second magnetic layer provided between the shield and the first magnetic layer, a third magnetic layer provided between the shield and the second magnetic layer, a first nonmagnetic layer provided between the first magnetic layer and the magnetic pole, a second nonmagnetic layer provided between the second magnetic layer and the first nonmagnetic layer, a third nonmagnetic layer provided between the third magnetic layer and the second nonmagnetic layer, and a fourth nonmagnetic layer provided between the shield and the third magnetic layer. The first nonmagnetic layer and the third nonmagnetic layer include at least one selected from the group consisting of Cu, Ag, Au, Al, and Ti. The second nonmagnetic layer and the fourth nonmagnetic layer include at least one selected from the group consisting of Ta, Pt, Ir, W, Mo, Cr, Tb, Rh, Pd, and Ru. Thicknesses along a first direction of the second nonmagnetic layer and the fourth nonmagnetic layer each are not less than 1 nm and not more than 3 nm. The first direction is from the shield toward the magnetic pole.

According to another embodiment, a magnetic head includes a shield, a magnetic pole having a medium-opposing surface, a first magnetic layer, a second magnetic layer, a third magnetic layer, a first nonmagnetic layer, a second nonmagnetic layer, a third nonmagnetic layer, a fourth nonmagnetic layer, a fifth nonmagnetic layer, and a sixth nonmagnetic layer. A first direction from the shield toward the magnetic pole is along the medium-opposing surface. A position in the first direction of the first magnetic layer is between a position in the first direction of the shield and a position in the first direction of the magnetic pole. The second magnetic layer is provided between the shield and the magnetic pole. A position of the second magnetic layer in a second direction is between a position in the second direction of the first magnetic layer and a position in the second direction of a plane including the medium-opposing surface. The second direction crosses the medium-opposing surface. The third magnetic layer is provided between the second magnetic layer and the magnetic pole. The first nonmagnetic layer is provided between the first magnetic layer and the magnetic pole. The second nonmagnetic layer is provided between the shield and the second magnetic layer. The third nonmagnetic layer is provided between the second magnetic layer and the third magnetic layer. The fourth nonmagnetic layer is provided between the third magnetic layer and the magnetic pole. The first magnetic layer is provided between the fifth nonmagnetic layer and the first nonmagnetic layer. The sixth nonmagnetic layer is provided between the second nonmagnetic layer and the second magnetic layer.

According to another embodiment, a magnetic head includes a shield, a magnetic pole having a medium-opposing surface, a first magnetic layer, a second magnetic layer, a third magnetic layer, a first nonmagnetic layer, a second nonmagnetic layer, a third nonmagnetic layer, a fourth nonmagnetic layer, a fifth nonmagnetic layer, and a sixth nonmagnetic layer. A first direction from the shield toward the magnetic pole is along the medium-opposing surface. A position in the first direction of the first magnetic layer is between a position in the first direction of the shield and a position in the first direction of the magnetic pole. The second magnetic layer is provided between the shield and the magnetic pole. A position of the second magnetic layer in a second direction is between a position in the second direction of the first magnetic layer and a position in the second direction of a plane including the medium-opposing surface. The second direction crosses the medium-opposing surface. The third magnetic layer is provided between the shield and the second magnetic layer. The first nonmagnetic layer is provided between the first magnetic layer and the magnetic pole. The second nonmagnetic layer is provided between the second magnetic layer and the magnetic pole. The third nonmagnetic layer is provided between the third magnetic layer and the second magnetic layer. The fourth nonmagnetic layer is provided between the shield and the third magnetic layer. The first magnetic layer is provided between the fifth nonmagnetic layer and the first nonmagnetic layer. The sixth nonmagnetic layer is provided between the second magnetic layer and the second nonmagnetic layer.

According to another embodiment, a magnetic recording device includes the magnetic head according to any one of the above, and a circuit portion. The circuit portion includes a first circuit configured to supply a first current having an orientation from the first magnetic layer toward the first nonmagnetic layer, and a second circuit configured to supply a second current having an orientation from the second nonmagnetic layer toward the fourth nonmagnetic layer. The circuit portion is configured to control the first current and the second current independently from each other.

According to another embodiment, a magnetic recording device includes a shield, a magnetic pole, a first magnetic layer provided between the shield and the magnetic pole, a second magnetic layer provided between the first magnetic layer and the magnetic pole, a third magnetic layer provided between the second magnetic layer and the magnetic pole, a first nonmagnetic layer provided between the shield and the first magnetic layer, a second nonmagnetic layer provided between the first magnetic layer and the second magnetic layer, a third nonmagnetic layer provided between the second magnetic layer and the third magnetic layer, a fourth nonmagnetic layer provided between the third magnetic layer and the magnetic pole, and a circuit portion. The circuit portion includes a first circuit and a second circuit. The first circuit is configured to supply a first current having an orientation from the first nonmagnetic layer toward the second nonmagnetic layer. The second circuit is configured to supply a second current having an orientation from the second nonmagnetic layer toward the fourth nonmagnetic layer. The circuit portion is configured to control the first current and the second current independently from each other.

According to another embodiment, a magnetic recording device includes a shield, a magnetic pole, a first magnetic layer provided between the shield and the magnetic pole, a second magnetic layer provided between the first magnetic layer and the magnetic pole, a third magnetic layer provided between the first magnetic layer and the second magnetic layer, a first nonmagnetic layer provided between the shield and the first magnetic layer, a second nonmagnetic layer provided between the first magnetic layer and the third magnetic layer, a third nonmagnetic layer provided between the third magnetic layer and the second magnetic layer, a fourth nonmagnetic layer provided between the second magnetic layer and the magnetic pole, and a circuit portion. The circuit portion includes a first circuit and a second circuit. The first circuit is configured to supply a first current having an orientation from the first nonmagnetic layer toward the second nonmagnetic layer. The second circuit is configured to supply a second current having an orientation from the fourth nonmagnetic layer toward the second nonmagnetic layer. The circuit portion is configured to control the first current and the second current independently from each other.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head and a magnetic recording device according to a first embodiment.

In the embodiment as shown in FIG. 1, the magnetic recording device 150 includes the magnetic head 110 and a magnetic recording medium 80. The magnetic recording device 150 may further include, for example, a recording current circuit (a third circuit 30D).

The magnetic head 110 includes a shield 31, a magnetic pole 30, first to third magnetic layers 11 to 13, and first to fourth nonmagnetic layers 21 to 24. In the example, the magnetic head 110 further includes a fifth nonmagnetic layer 25 and a sixth nonmagnetic layer 26.

For example, the magnetic head 110 includes a coil 30c. At least a portion of the coil 30c opposes the magnetic pole 30. For example, a recording current Iw is supplied to the coil 30c from the recording current circuit (the third circuit 30D). Thereby, a recording magnetic field that corresponds to the recording current Iw is generated from the magnetic pole 30. The recording magnetic field is applied to the magnetic recording medium 80; and the orientation of the magnetization of the magnetic recording medium 80 is controlled. Thereby, information is recorded in the magnetic recording medium 80.

The magnetic pole 30 is, for example, a major magnetic pole. The magnetic pole 30 has a medium-opposing surface 30F. The medium-opposing surface 30F is along the ABS (Air Bearing Surface) of the magnetic head 110. The medium-opposing surface 30F opposes the magnetic recording medium 80.

A direction perpendicular to the medium-opposing surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction.

The Y-axis direction is the cross-track direction. For example, the shield 31 corresponds to a "trailing shield." The shield 31 is, for example, an auxiliary magnetic pole. The shield 31 can form a magnetic core with the magnetic pole 30. For example, an additional shield such as a side shield (not illustrated), etc., may be provided.

In the magnetic head 110, the first magnetic layer 11 is provided between the shield 31 and the magnetic pole 30. The second magnetic layer 12 is provided between the first magnetic layer 11 and the magnetic pole 30. The third magnetic layer 13 is provided between the second magnetic layer 12 and the magnetic pole 30.

A direction from the shield 31 toward the magnetic pole 30 is taken as a first direction D1. For example, the first direction D1 is aligned with the X-axis direction.

The first magnetic layer 11 includes, for example, at least one selected from the group consisting of FeNi and CoFe. The second magnetic layer 12 and the third magnetic layer 13 include, for example, an FeCo alloy, etc. Examples of the materials of these magnetic layers are described below.

The first nonmagnetic layer 21 is provided between the shield 31 and the first magnetic layer 11. The second nonmagnetic layer 22 is provided between the first magnetic layer 11 and the second magnetic layer 12. The third nonmagnetic layer 23 is provided between the second magnetic layer 12 and the third magnetic layer 13. The fourth nonmagnetic layer 24 is provided between the third magnetic layer 13 and the magnetic pole 30. The fifth nonmagnetic layer 25 is provided between the first magnetic layer 11 and the second nonmagnetic layer 22. The sixth nonmagnetic layer 26 is provided between the second nonmagnetic layer 22 and the second magnetic layer 12. The first to third magnetic layers 11 to 13 and the first to sixth nonmagnetic layers 21 to 26 are included in a stacked body SB.

The first nonmagnetic layer 21 and the third nonmagnetic layer 23 include, for example, at least one selected from the group consisting of Cu, Ag, Au, Al, and Ti. For example, the first nonmagnetic layer 21 and the third nonmagnetic layer 23 are layers that transmit spin.

The second nonmagnetic layer 22 and the fourth nonmagnetic layer 24 include, for example, at least one selected from the group consisting of Ta, Pt, Ir, W, Mo, Cr, Tb, Rh, Pd, and Ru. The second nonmagnetic layer 22 and the fourth nonmagnetic layer 24 are, for example, layers that quench (or weaken) spin. The thicknesses along the first direction D1 of the second nonmagnetic layer 22 and the fourth nonmagnetic layer each are, for example, not less than 1 nm and not more than 3 nm.

The fifth nonmagnetic layer 25 and the sixth nonmagnetic layer 26 include, for example, at least one selected from the group consisting of Cu, Ag, Au, Al, Ti, and Ru. The thicknesses along the first direction D1 of the fifth nonmagnetic layer 25 and the sixth nonmagnetic layer 26 each are not less than 1 nm and not more than 3 nm. At least one of the fifth nonmagnetic layer 25 or the sixth nonmagnetic layer 26 may be provided. By these nonmagnetic layers, for example, the increase of the damping in the first magnetic layer 11 is suppressed. By these nonmagnetic layers, for example, the increase of the damping in the second magnetic layer 12 is suppressed. For example, the operating current density decreases. For example, a long life is obtained.

As shown in FIG. 1, a first current I1 can flow in the magnetic head 110. The first current I1 has an orientation from the shield 31 toward the magnetic pole 30. The first current has an orientation from the first nonmagnetic layer 21 toward the fourth nonmagnetic layer 24. For example, the first current I1 is supplied from a first circuit 10D. For example, the first circuit 10D is electrically connected to the shield 31 and the magnetic pole 30.

The first current I1 flows through the first nonmagnetic layer 21, the first magnetic layer 11, the fifth nonmagnetic layer 25, the second nonmagnetic layer 22, the sixth nonmagnetic layer 26, the second magnetic layer 12, the third nonmagnetic layer 23, the third magnetic layer 13, and the fourth nonmagnetic layer 24 in the direction from the first nonmagnetic layer 21 toward the fourth nonmagnetic layer 24.

A first electron current Je1 flows due to the first current IL The first electron current Je1 flows in an orientation from the magnetic pole 30 toward the shield 31.

The magnetic pole 30 has a magnetic pole magnetization 30M. The shield 31 has a shield magnetization 31M. The first magnetic layer 11 has a first magnetic layer magnetization 11M. The second magnetic layer 12 has a second magnetic layer magnetization 12M. The third magnetic layer 13 has a third magnetic layer magnetization 13M.

For example, the first magnetic layer magnetization 11M is reversed with respect to the shield magnetization 31M and the magnetic pole magnetization 30M by the first current I1 (the first electron current Je1). Thereby, the recording magnetic field that is generated by the magnetic pole 30 does not pass through the stacked body SB easily. The magnetic field (the gap magnetic field) between the shield 31 and the magnetic pole 30 can be reduced.

Thereby, much of the recording magnetic field is oriented toward the magnetic recording medium 80. The recording magnetic field is applied efficiently to the magnetic recording medium 80. For example, the first magnetic layer 11 functions as a MFCL (Magnetic Field Control Layer).

On the other hand, spin is injected from the third magnetic layer 13 into the second magnetic layer 12 by the first current (the first electron current Je1) and the gap magnetic field; and the second magnetic layer magnetization 12M rotates. For example, the third magnetic layer 13 functions as a spin injection layer. For example, the second magnetic layer 12 functions as an oscillation generation layer. The stacked body that includes the second magnetic layer 12, the third nonmagnetic layer 23, and the third magnetic layer 13 functions as, for example, a STO (Spin Torque Oscillator). For example, spin torque is mutually applied between the second magnetic layer 12 and the third magnetic layer 13. For example, as the current is increased, first, the third magnetic layer magnetization 13M of the third magnetic layer 13 reverses; subsequently, the second magnetic layer magnetization 12M of the second magnetic layer 12 starts to oscillate. When the second magnetic layer magnetization 12M starts to oscillate, the second magnetic layer magnetization 12M oscillates in the orientation of the reverse direction of the third magnetic layer magnetization 13M. For example, the second magnetic layer magnetization 12M tilts in the gap magnetic field direction and oscillates substantially in the plane.

A high frequency magnetic field is generated from the STO; and the high frequency magnetic field is applied to the magnetic recording medium 80. The orientation of the magnetization changes more easily at the portion of the magnetic recording medium 80 to which the high frequency wave is applied. The orientation of the magnetization of the magnetic recording medium 80 can be controlled easily.

By providing the first magnetic layer 11 in the embodiment, the gap magnetic field can be reduced without reducing the recording magnetic field. Thereby, for example, the second magnetic layer magnetization 12M can be rotated by the spin torque at a low current density. For example, the recording characteristics can be improved thereby. For example, the recording density can be increased. For example, high reliability is easier to obtain. In the embodiment, a magnetic head and a magnetic recording device can be provided in which the recording density can be increased.

For example, the gap magnetic field applied to the STO can be controlled by the first magnetic layer 11. For example, the recording magnetic field and the gap magnetic field applied to the STO can be designed independently. Thereby, for example, the adjustment of the oscillation frequency of the STO is easy.

Figure 2:
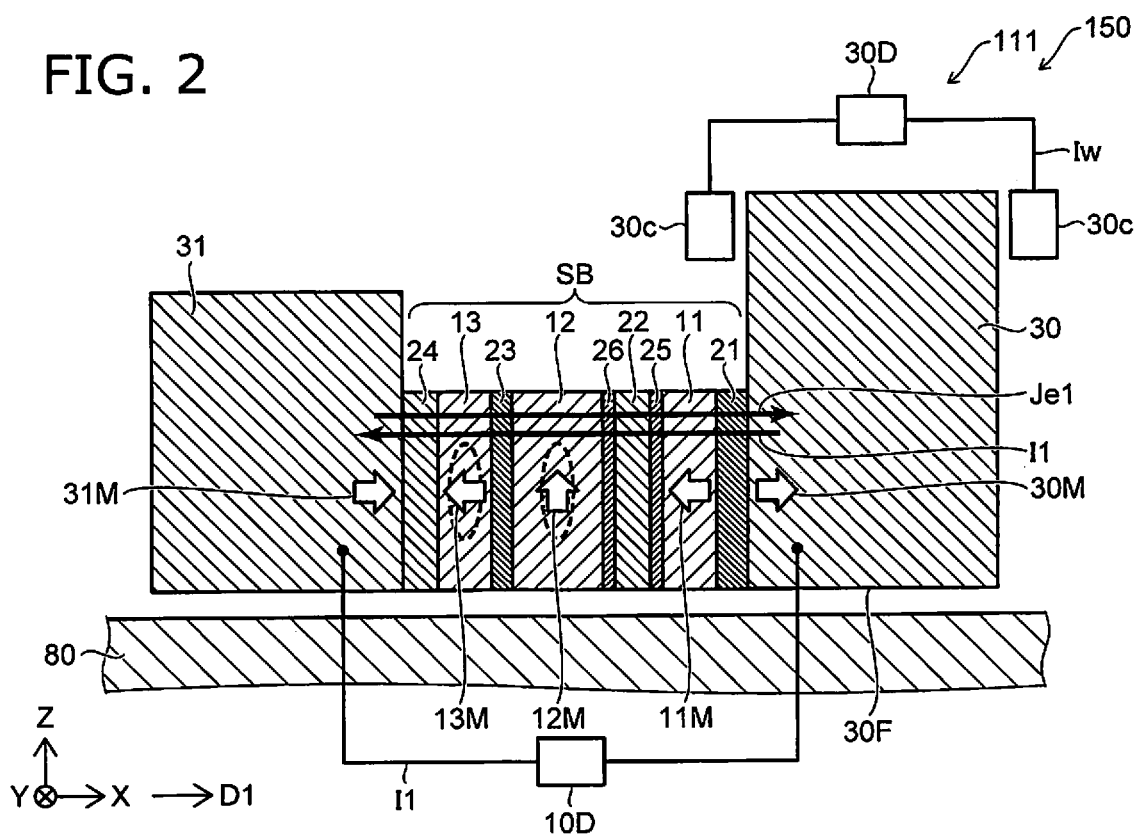
FIG. 2 is a schematic cross-sectional view illustrating the magnetic head and the magnetic recording device according to the first embodiment.

FIG. 2 is a schematic cross-sectional view illustrating the magnetic head and the magnetic recording device according to the first embodiment.

In the embodiment as shown in FIG. 2, the magnetic recording device 150 includes a magnetic head 111 and the magnetic recording medium 80. The magnetic head 111 includes the shield 31, the magnetic pole 30, the first to third magnetic layers 11 to 13, and the first to fourth nonmagnetic layers 21 to 24. In the example, the magnetic head 111 further includes the fifth nonmagnetic layer 25 and the sixth nonmagnetic layer 26.

In the magnetic head 111, the first magnetic layer 11 is provided between the shield 31 and the magnetic pole 30. The second magnetic layer 12 is provided between the shield 31 and the first magnetic layer 11. The third magnetic layer 13 is provided between the shield 31 and the second magnetic layer 12.

The first nonmagnetic layer 21 is provided between the first magnetic layer 11 and the magnetic pole 30. The second nonmagnetic layer 22 is provided between the second magnetic layer 12 and the first nonmagnetic layer 21. The third nonmagnetic layer 23 is provided between the third magnetic layer 13 and the second nonmagnetic layer 22. The fourth nonmagnetic layer 24 is provided between the shield 31 and the third magnetic layer 13. The fifth nonmagnetic layer 25 is provided between the second nonmagnetic layer 22 and the first magnetic layer 11. The sixth nonmagnetic layer 26 is provided between the second magnetic layer 12 and the second nonmagnetic layer 22.

In such a case as well, the first nonmagnetic layer 21 and the third nonmagnetic layer 23 include at least one selected from the group consisting of Cu, Ag, Au, Al, and Ti. The second nonmagnetic layer 22 and the fourth nonmagnetic layer 24 include at least one selected from the group consisting of Ta, Pt, Ir, W, Mo, Cr, Tb, Rh, Pd, and Ru. The thicknesses along the first direction D1 (the direction from the shield 31 toward the magnetic pole 30) of the second nonmagnetic layer 22 and the fourth nonmagnetic layer 24 each are not less than 1 nm and not more than 3 nm. The fifth nonmagnetic layer 25 and the sixth nonmagnetic layer 26 include at least one selected from the group consisting of Cu, Ag, Au, Al, Ti, and Ru. The thicknesses along the first direction D1 of the fifth nonmagnetic layer 25 and the sixth nonmagnetic layer 26 each are not less than 1 nm and not more than 3 nm. At least one of the fifth nonmagnetic layer 25 or the sixth nonmagnetic layer 26 may be provided. For example, the increase of the damping in the first magnetic layer 11 is suppressed. For example, the increase of the damping in the second magnetic layer 12 is suppressed. For example, the operating current density decreases. For example, a long life is obtained.

In the magnetic head 111 as shown in FIG. 2, the first current I1 flows from the magnetic pole 30 toward the shield 31. The first current I1 has an orientation from the first nonmagnetic layer 21 toward the fourth nonmagnetic layer 24. The first electron current Je1 has an orientation from the shield 31 toward the magnetic pole 30. The first current I1 is supplied from the first circuit 10D.

In the magnetic head 111 as well, the gap magnetic field can be reduced without reducing the recording magnetic field. For example, the second magnetic layer magnetization 12M can be rotated by the spin torque at a low current density. For example, the recording characteristics can be improved. The recording density can be increased. For example, high reliability is easier to obtain. A magnetic head and a magnetic recording device can be provided in which the recording density can be increased. For example, the adjustment of the oscillation frequency of the STO is easy.

In the magnetic heads 110 and 111, for example, the first magnetic layer 11 contacts the first nonmagnetic layer 21 and the fifth nonmagnetic layer 25. The second nonmagnetic layer 22 contacts the fifth nonmagnetic layer 25 and the sixth nonmagnetic layer 26. The second magnetic layer 12 contacts the sixth nonmagnetic layer 26 and the third nonmagnetic layer 23. The third magnetic layer 13 contacts the third nonmagnetic layer 23 and the fourth nonmagnetic layer 24.

In the magnetic heads 110 and 111, for example, the product of the thickness (the thickness along the first direction D1) of the second magnetic layer 12 and a second saturation magnetic flux density of the second magnetic layer 12 is larger than the product of the thickness (the thickness along the first direction D1) of the third magnetic layer and a third saturation magnetic flux density of the third magnetic layer 13. Thereby, oscillation occurs easily in the second magnetic layer 12. For example, the product of the volume of the second magnetic layer 12 and the second saturation magnetic flux density of the second magnetic layer 12 is larger than the product of the volume of the third magnetic layer 13 and the third saturation magnetic flux density of the third magnetic layer 13. For example, the thickness of the third magnetic layer 13 is thinner than the thickness of the second magnetic layer 12. Thereby, for example, stable oscillation is obtained in the second magnetic layer 12 and the third magnetic layer 13.

Second Embodiment

Figure 3:
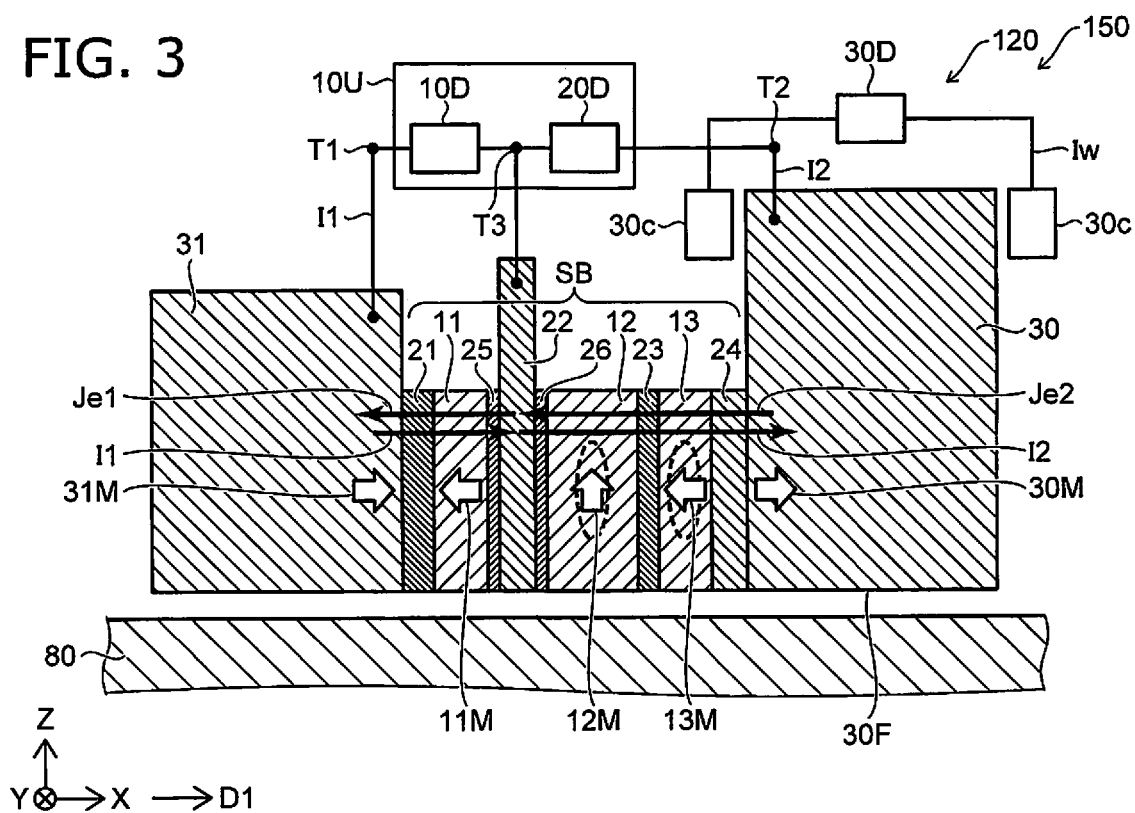
FIG. 3 is a schematic cross-sectional view illustrating a magnetic head and a magnetic recording device according to a second embodiment.

FIG. 3 is a schematic cross-sectional view illustrating a magnetic head and a magnetic recording device according to a second embodiment.

In the embodiment as shown in FIG. 3, the magnetic recording device 150 includes the magnetic head 120, the magnetic recording medium 80, and a circuit portion 10U. For example, the magnetic recording device 150 may further include a recording current circuit (the third circuit 30D).

The magnetic head 120 includes the shield 31, the magnetic pole 30, the first to third magnetic layers 11 to 13, and the first to fourth nonmagnetic layers 21 to 24. In the example, the magnetic head 120 further includes the fifth nonmagnetic layer 25 and the sixth nonmagnetic layer 26.

The first magnetic layer 11 is provided between the shield 31 and the magnetic pole 30. The second magnetic layer 12 is provided between the first magnetic layer 11 and the magnetic pole 30. The third magnetic layer 13 is provided between the second magnetic layer 12 and the magnetic pole 30.

The first nonmagnetic layer 21 is provided between the shield 31 and the first magnetic layer 11. The second nonmagnetic layer 22 is provided between the first magnetic layer 11 and the second magnetic layer 12. The third nonmagnetic layer 23 is provided between the second magnetic layer 12 and the third magnetic layer 13. The fourth nonmagnetic layer 24 is provided between the third magnetic layer 13 and the magnetic pole 30. The fifth nonmagnetic layer 25 is provided between the first magnetic layer 11 and the second nonmagnetic layer 22. The sixth nonmagnetic layer 26 is provided between the second nonmagnetic layer 22 and the second magnetic layer 12.

The circuit portion 10U includes the first circuit 10D and a second circuit 20D. The first circuit 10D is configured to supply the first current I1. The first current I1 has an orientation from the shield 31 toward the second nonmagnetic layer 22. The first current I1 has an orientation from the first nonmagnetic layer 21 toward the second nonmagnetic layer 22. The second circuit 20D is configured to supply a second current I2. The second current I2 has an orientation from the second nonmagnetic layer 22 toward the magnetic pole 30. The second current I2 has an orientation from the second nonmagnetic layer 22 toward the fourth nonmagnetic layer 24. The orientation of the first electron current Je1 based on the first current I1 is the reverse of the orientation of the first current I1. The orientation of a second electron current Je2 based on the second current I2 is the reverse of the orientation of the second current I2.

For example, the magnetic head 120 includes first to third terminals T1 to T3. The first terminal T1 is electrically connected to the shield 31. The second terminal T2 is electrically connected to the magnetic pole 30. The third terminal T3 is electrically connected to the second nonmagnetic layer 22.

One end of the first circuit 10D is electrically connected to the first terminal T1. The other end of the first circuit 10D is electrically connected to the third terminal T3. One end of the second circuit 20D is electrically connected to the second terminal T2. The other end of the second circuit 20D is electrically connected to the third terminal T3.

The first magnetic layer magnetization 11M of the first magnetic layer 11 is reversed with respect to the shield magnetization 31M and the magnetic pole magnetization 30M by the first current I1. The second magnetic layer magnetization 12M rotates due to the second current I2. The second magnetic layer 12 oscillates.

The circuit portion 10U is configured to control the first current I1 and the second current I2 independently from each other. Thereby, the oscillation frequency of the STO can be adjusted easily by the second current I2 while reducing the gap magnetic field by the first current I1. The recording density can be increased easily thereby. For example, a magnetic head and a magnetic recording device can be provided in which the recording density can be increased.

For example, there are cases where the oscillation frequency of the STO fluctuates due to fluctuation of the manufacturing processes, etc. In such a case, the adjustment of the oscillation frequency is easy by controlling the first current I1 and the second current I2 independently.

In the magnetic head 120, the first nonmagnetic layer 21 and the third nonmagnetic layer 23 include, for example, at least one selected from the group consisting of Cu, Ag, Au, Al, and Ti. The second nonmagnetic layer 22 and the fourth nonmagnetic layer 24 include, for example, at least one selected from the group consisting of Ta, Pt, Ir, W, Mo, Cr, Tb, Rh, Pd, and Ru. The thicknesses along the first direction D1 (the direction from the shield 31 toward the magnetic pole 30) of the second nonmagnetic layer 22 and the fourth nonmagnetic layer 24 each are not less than 1 nm and not more than 3 nm. The fifth nonmagnetic layer 25 and the sixth nonmagnetic layer 26 include, for example, at least one selected from the group consisting of Cu, Ag, Au, Al, Ti, and Ru. The thicknesses along the first direction D1 of the fifth nonmagnetic layer 25 and the sixth nonmagnetic layer 26 each are not less than 1 nm and not more than 3 nm. At least one of the fifth nonmagnetic layer 25 or the sixth nonmagnetic layer 26 may be provided. For example, the increase of the damping in the first magnetic layer 11 is suppressed. For example, the increase of the damping in the second magnetic layer 12 is suppressed. For example, the operating current density decreases. For example, a long life is obtained.

In the magnetic head 120, for example, the first magnetic layer 11 contacts the first nonmagnetic layer 21 and the fifth nonmagnetic layer 25. The second nonmagnetic layer 22 contacts the fifth nonmagnetic layer 25 and the sixth nonmagnetic layer 26. The second magnetic layer 12 contacts the sixth nonmagnetic layer 26 and the third nonmagnetic layer 23. The third magnetic layer 13 contacts the third nonmagnetic layer 23 and the fourth nonmagnetic layer 24.

Figure 4:
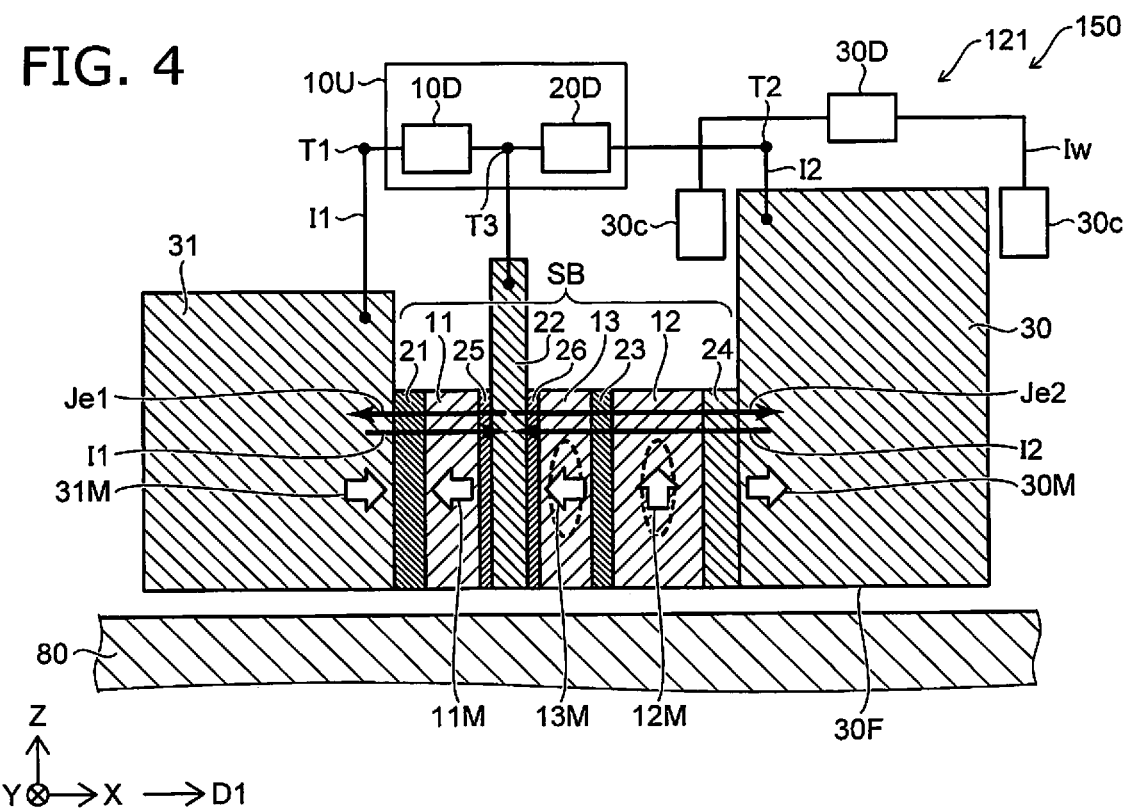
FIG. 4 is a schematic cross-sectional view illustrating the magnetic head and the magnetic recording device according to the second embodiment.

FIG. 4 is a schematic cross-sectional view illustrating the magnetic head and the magnetic recording device according to the second embodiment.

As shown in FIG. 4, the magnetic recording device 150 in the embodiment includes a magnetic head 121, the magnetic recording medium 80, and the circuit portion 10U. For example, the magnetic recording device 150 may further include a recording current circuit (the third circuit 30D).

The magnetic head 121 includes the shield 31, the magnetic pole 30, the first to third magnetic layers 11 to 13, and the first to fourth nonmagnetic layers 21 to 24. In the example, the magnetic head 120 further includes the fifth nonmagnetic layer 25 and the sixth nonmagnetic layer 26.

In the magnetic head 121, the first magnetic layer 11 is provided between the shield 31 and the magnetic pole 30. The second magnetic layer 12 is provided between the first magnetic layer 11 and the magnetic pole 30. The third magnetic layer 13 is provided between the first magnetic layer 11 and the second magnetic layer 12.

The first nonmagnetic layer 21 is provided between the shield 31 and the first magnetic layer 11. The second nonmagnetic layer 22 is provided between the first magnetic layer 11 and the third magnetic layer 13. The third nonmagnetic layer 23 is provided between the third magnetic layer 13 and the second magnetic layer 12. The fourth nonmagnetic layer 24 is provided between the second magnetic layer 12 and the magnetic pole 30. The fifth nonmagnetic layer 25 is provided between the first magnetic layer 11 and the second nonmagnetic layer 22. The sixth nonmagnetic layer 26 is provided between the second nonmagnetic layer 22 and the third magnetic layer 13.

In the example as well, the circuit portion 10U includes the first circuit 10D configured to supply the first current I1 and the second circuit 20D configured to supply the second current I2. The first current I1 has an orientation from the first nonmagnetic layer 21 toward the second nonmagnetic layer 22. The second current I2 has an orientation from the fourth nonmagnetic layer 24 toward the second nonmagnetic layer 22. The circuit portion 10U is configured to control the first current I1 and the second current I2 independently from each other.

For example, the oscillation frequency of the STO can be adjusted easily by the second current I2 while reducing the gap magnetic field by the first current I1. The recording density can be increased easily. For example, a magnetic head and a magnetic recording device can be provided in which the recording density can be increased. The adjustment of the oscillation frequency is easy.

In the magnetic head 121, the first nonmagnetic layer 21 and the third nonmagnetic layer 23 include, for example, at least one selected from the group consisting of Cu, Ag, Au, Al, and Ti. The second nonmagnetic layer 22 and the fourth nonmagnetic layer 24 include at least one selected from the group consisting of Ta, Pt, Ir, W, Mo, Cr, Tb, Rh, Pd, and Ru. The thicknesses (the thicknesses along the direction from the shield 31 toward the magnetic pole 30) of the second nonmagnetic layer 22 and the fourth nonmagnetic layer 24 each are not less than 1 nm and not more than 3 nm. The fifth nonmagnetic layer 25 and the sixth nonmagnetic layer include at least one selected from the group consisting of Cu, Ag, Au, Al, Ti, and Ru. The thicknesses (the thicknesses along the first direction D1) of the fifth nonmagnetic layer 25 and the sixth nonmagnetic layer 26 each are not less than 1 nm and not more than 3 nm. At least one of the fifth nonmagnetic layer 25 or the sixth nonmagnetic layer 26 may be provided. For example, the increase of the damping in the first magnetic layer 11 is suppressed. For example, the increase of the damping in the second magnetic layer 12 is suppressed. For example, the operating current density decreases. For example, a long life is obtained.

In the magnetic head 121, for example, the first magnetic layer 11 contacts the first nonmagnetic layer 21 and the fifth nonmagnetic layer 25. The second nonmagnetic layer 22 contacts the fifth nonmagnetic layer 25 and the sixth nonmagnetic layer 26. The third magnetic layer 13 contacts the sixth nonmagnetic layer 26 and the third nonmagnetic layer 23. The second magnetic layer 12 contacts the third nonmagnetic layer 23 and the fourth nonmagnetic layer 24.

In the magnetic heads 120 and 121, for example, the product of the thickness (the thickness along the first direction D1) of the second magnetic layer 12 and the second saturation magnetic flux density of the second magnetic layer 12 is larger than the product of the thickness (the thickness along the first direction D1) of the third magnetic layer and the third saturation magnetic flux density of the third magnetic layer 13. Thereby, the oscillation occurs easily in the second magnetic layer 12. For example, the product of the volume of the second magnetic layer 12 and the second saturation magnetic flux density of the second magnetic layer 12 is larger than the product of the volume of the third magnetic layer 13 and the third saturation magnetic flux density of the third magnetic layer 13. For example, the thickness of the third magnetic layer 13 is thinner than the thickness of the second magnetic layer 12. Thereby, for example, stable oscillation is obtained in the second magnetic layer 12 and the third magnetic layer 13.

Third Embodiment

Figure 5:
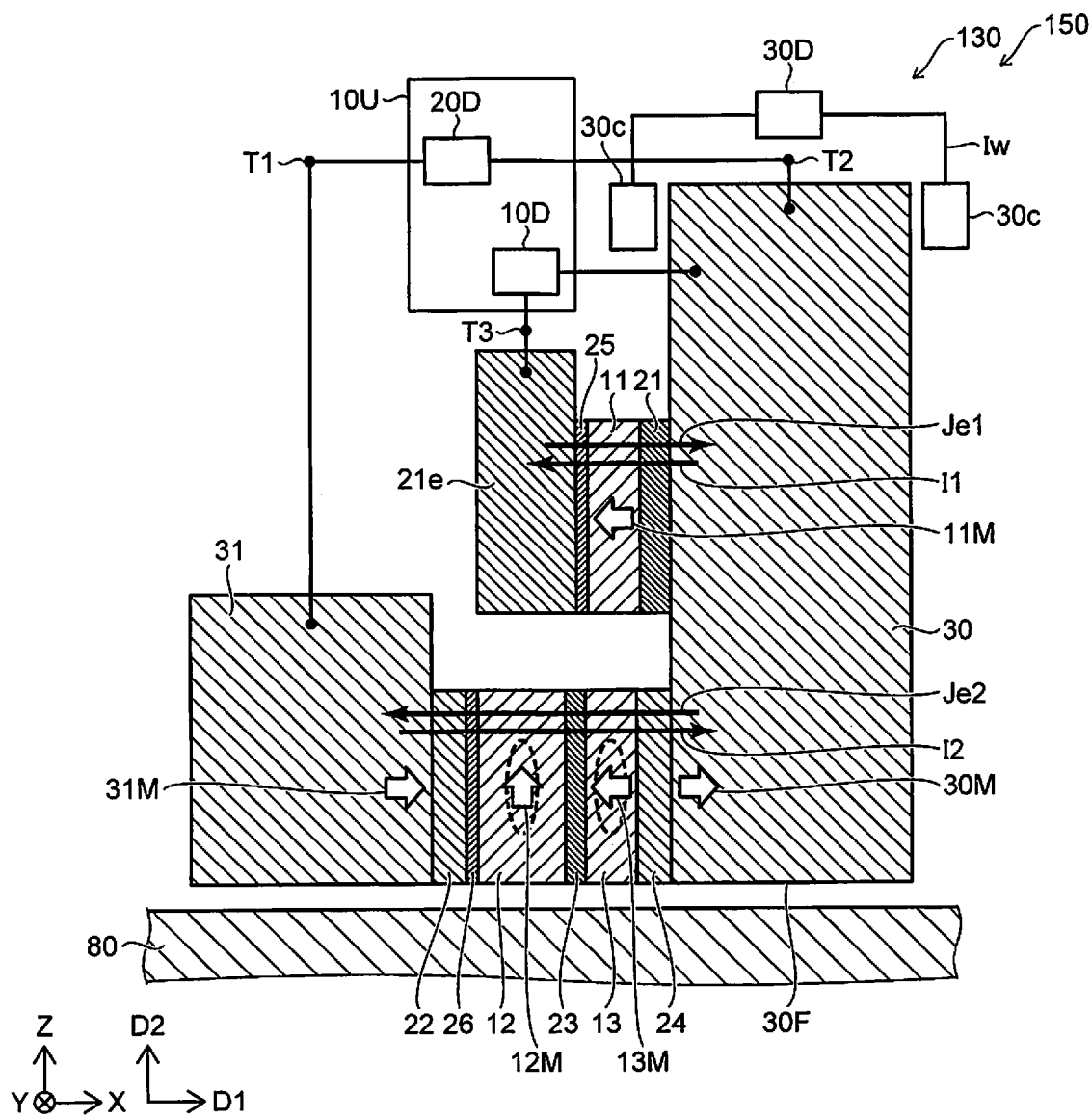
FIG. 5 is a schematic cross-sectional view illustrating a magnetic head and a magnetic recording device according to a third embodiment.

FIG. 5 is a schematic cross-sectional view illustrating a magnetic head and a magnetic recording device according to a third embodiment.

In the embodiment as shown in FIG. 5, the magnetic recording device 150 includes the magnetic head 130, the magnetic recording medium 80, and the circuit portion 10U. For example, the magnetic recording device 150 may further include a recording current circuit (the third circuit 30D).

The magnetic head 130 includes the shield 31, the magnetic pole 30, the first to third magnetic layers 11 to 13, and the first to fourth nonmagnetic layers 21 to 24. In the example, the magnetic head 130 further includes the fifth nonmagnetic layer 25 and the sixth nonmagnetic layer 26.

The magnetic pole 30 has the medium-opposing surface 30F. The first direction D1 from the shield 31. toward the magnetic pole 30 is along the medium-opposing surface 30F. For example, the medium-opposing surface 30F is along the X-Y plane.

The position in the first direction D1 of the first magnetic layer 11 is between the position in the first direction D1 of the shield 31 and the position in the first direction D1 of the magnetic pole 30.

The second magnetic layer 12 is provided between the shield 31 and the magnetic pole 30. A direction crossing the medium-opposing surface 30F is taken as a second direction D2. For example, the second direction D2 is aligned with the Z-axis direction. The position in the second direction D2 of the second magnetic layer 12 is between the position in the second direction D2 of a plane (a plane along the X-Y plane) including the medium-opposing surface 30F and the position in the second direction D2 of the first magnetic layer 11.

The third magnetic layer 13 is provided between the second magnetic layer 12 and the magnetic pole 30.

The first nonmagnetic layer 21 is provided between the first magnetic layer 11 and the magnetic pole 30. The second nonmagnetic layer 22 is provided between the shield 31 and the second magnetic layer 12. The third nonmagnetic layer 23 is provided between the second magnetic layer 12 and the third magnetic layer 13. The fourth nonmagnetic layer 24 is provided between the third magnetic layer 13 and the magnetic pole 30. The first magnetic layer 11 is provided between the fifth nonmagnetic layer 25 and the first nonmagnetic layer 21. The sixth nonmagnetic layer 26 is provided between the second nonmagnetic layer 22 and the second magnetic layer 12.

In the magnetic head 130, the first magnetic layer 11 is provided separately from the stacked body including the second magnetic layer 12 and the third magnetic layer 13. The first current I1 that flows in the first magnetic layer 11 and the second current I2 that flows in the stacked body including the second magnetic layer 12 and the third magnetic layer 13 are controllable independently from each other.

In the magnetic head 130, the first magnetic layer magnetization 11M is reversed with respect to the orientations of the shield magnetization 31M and the magnetic pole magnetization 30M by the first current I1 flowing in the first magnetic layer 11. The gap magnetic field increases.

For example, the oscillation frequency of the STO can be adjusted easily by the second current I2 flowing in the stacked body including the second magnetic layer 12 and the third magnetic layer 13 while increasing the gap magnetic field by the first current I1. The recording density can be increased easily. For example, a magnetic head and a magnetic recording device can be provided in which the recording density can be increased. The adjustment of the oscillation frequency is easy.

The magnetic recording device 150 that includes the magnetic head 130 may include the circuit portion 10U. The circuit portion 10U includes the first circuit 10D configured to supply the first current I1 and the second circuit 20D configured to supply the second current I2. The first current I1 has an orientation from the first magnetic layer 11 toward the first nonmagnetic layer 21. The first current I1 has an orientation from the magnetic pole 30 toward the first nonmagnetic layer 21. The second current I2 has an orientation from the second nonmagnetic layer 22 toward the fourth nonmagnetic layer 24. The second current I2 has an orientation from the shield 31 toward the magnetic pole 30. The circuit portion 10U is configured to control the first current I1 and the second current I2 independently from each other.

A conductive layer 21e is provided in the example. The first nonmagnetic layer 21 is between the conductive layer 21e and the first magnetic layer 11.

For example, the magnetic head 130 includes the first to third terminals T1 to T3. The first terminal T1 is electrically connected to the shield 31. The second terminal T2 is electrically connected to the magnetic pole 30. The third terminal T3 is electrically connected to the conductive layer 21e.

One end of the second circuit 20D is electrically connected to the first terminal T1. The other end of the second circuit 20D is electrically connected to the third terminal T3. One end of the first circuit 10D is electrically connected to the second terminal T2. The other end of the first circuit 10D is electrically connected to the third terminal T3.

In the magnetic head 130, the first nonmagnetic layer 21 and the third nonmagnetic layer 23 include, for example, at least one selected from the group consisting of Cu, Ag, Au, Al, and Ti. The second nonmagnetic layer 22 and the fourth nonmagnetic layer include at least one selected from the group consisting of Ta, Pt, Ir, W, Mo, Cr, Tb, Rh, Pd, and Ru. The thicknesses along the first direction D1 (the direction from the shield 31 toward the magnetic pole 30) of the second nonmagnetic layer 22 and the fourth nonmagnetic layer 24 each are not less than 1 nm and not more than 3 nm. The fifth nonmagnetic layer 25 and the sixth nonmagnetic layer 26 include at least one selected from the group consisting of Cu, Ag, Au, Al, Ti, and Ru. The thicknesses along the first direction D1 of the fifth nonmagnetic layer 25 and the sixth nonmagnetic layer 26 each are not less than 1 nm and not more than 3 nm. At least one of the fifth nonmagnetic layer 25 or the sixth nonmagnetic layer 26 may be provided. For example, the increase of the damping in the first magnetic layer 11 is suppressed. For example, the increase of the damping in the second magnetic layer 12 is suppressed. For example, the operating current density decreases. For example, a long life is obtained.

In the magnetic head 130, for example, the first magnetic layer 11 contacts the first nonmagnetic layer 21 and the fifth nonmagnetic layer 25. The sixth nonmagnetic layer 26 contacts the second nonmagnetic layer 22 and the second magnetic layer 12. The second magnetic layer 12 contacts the sixth nonmagnetic layer 26 and the third nonmagnetic layer 23. The third magnetic layer 13 contacts the third nonmagnetic layer 23 and the fourth nonmagnetic layer 24.

Figure 6:
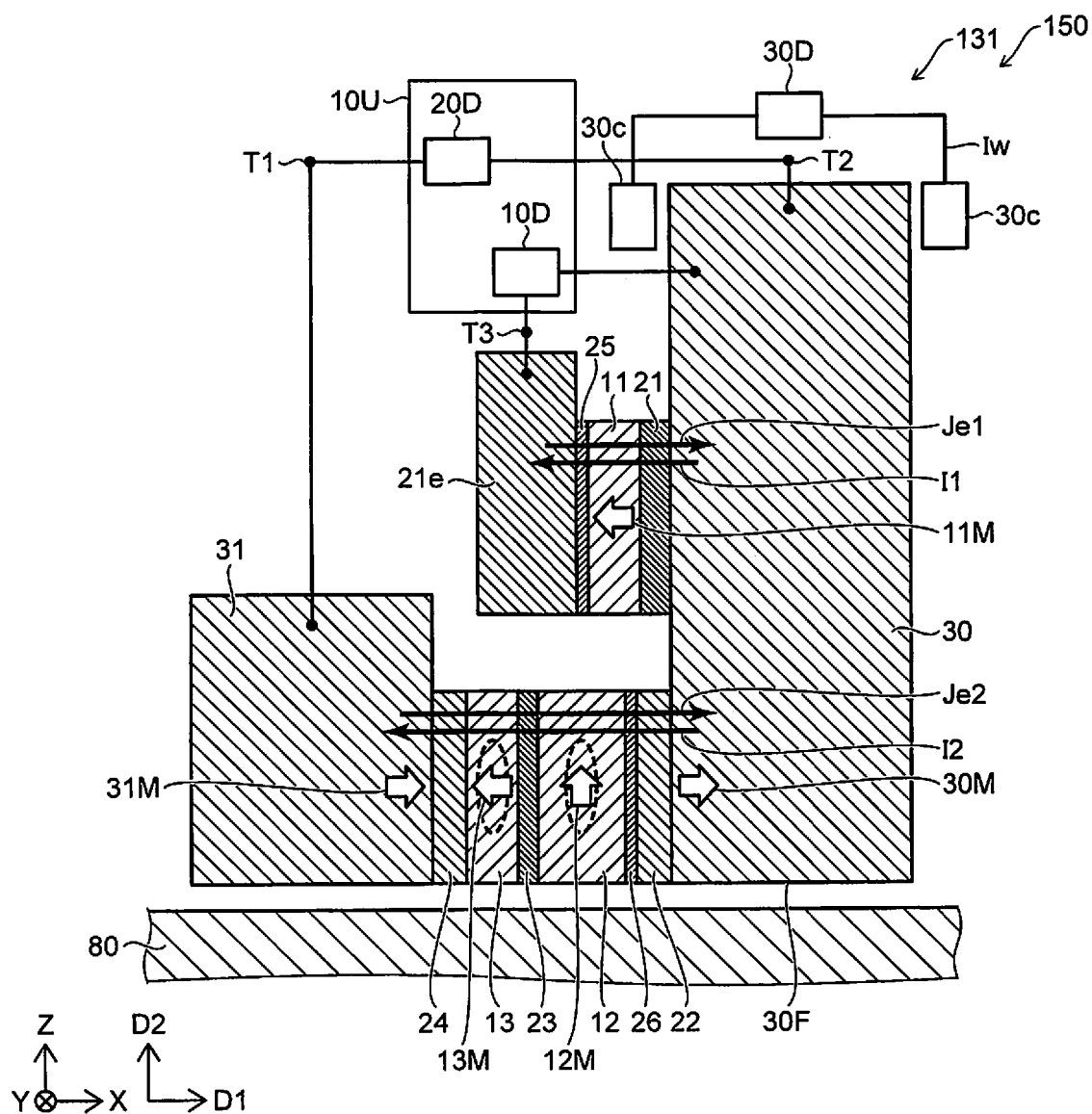
FIG. 6 is a schematic cross-sectional view illustrating the magnetic head and the magnetic recording device according to the third embodiment.

FIG. 6 is a schematic cross-sectional view illustrating the magnetic head and the magnetic recording device according to the third embodiment.

In the embodiment as shown in FIG. 6, the magnetic recording device 150 includes a magnetic head 131, the magnetic recording medium 80, and the circuit portion 10U. For example, the magnetic recording device 150 may further include a recording current circuit (the third circuit 30D).

The magnetic head 131 includes the shield 31, the magnetic pole 30, the first to third magnetic layers 11 to 13, and the first to fourth nonmagnetic layers 21 to 24. In the example, the magnetic head 131 further includes the fifth nonmagnetic layer 25 and the sixth nonmagnetic layer 26.

The first direction D1 from the shield 31 toward the magnetic pole 30 is along the medium-opposing surface 30F of the magnetic pole 30. The position in the first direction D1 of the first magnetic layer 11 is between the position in the first direction D1 of the shield 31 and the position in the first direction D1 of the magnetic pole 30.

The second magnetic layer 12 is provided between the shield 31 and the magnetic pole 30. The position of the second magnetic layer 12 in the second direction D2 crossing the medium-opposing surface 30F is between the position in the second direction D2 of the first magnetic layer 11 and the position in the second direction D2 of a plane including the medium-opposing surface 30F.

The third magnetic layer 13 is provided between the shield 31 and the second magnetic layer 12.

The first nonmagnetic layer 21 is provided between the first magnetic layer 11 and the magnetic pole 30. The second nonmagnetic layer 22 is provided between the second magnetic layer 12 and the magnetic pole 30. The third nonmagnetic layer 23 is provided between the third magnetic layer 13 and the second magnetic layer 12. The fourth nonmagnetic layer 24 is provided between the shield 31 and the third magnetic layer 13. The first magnetic layer 11 is provided between the fifth nonmagnetic layer 25 and the first nonmagnetic layer 21. The sixth nonmagnetic layer 26 is provided between the second nonmagnetic layer 22 and the second magnetic layer 12.

In the magnetic head 131 as well, the first magnetic layer 11 is provided separately from the stacked body including the second magnetic layer 12 and the third magnetic layer 13. The first current I1 that flows in the first magnetic layer 11 and the second current I2 that flows in the stacked body including the second magnetic layer 12 and the third magnetic layer 13 are controllable independently from each other. The first current I1 has an orientation from the first magnetic layer 11 toward the first nonmagnetic layer 21. The second current I2 has an orientation from the second nonmagnetic layer 22 toward the fourth nonmagnetic layer 24.

In the magnetic head 131, the first magnetic layer magnetization 11M is reversed with respect to the orientations of the shield magnetization 31M and the magnetic pole magnetization 30M by the first current I1 flowing in the first magnetic layer 11. The gap magnetic field increases.

For example, the oscillation frequency of the STO can be adjusted easily by the second current I2 flowing in the stacked body including the second magnetic layer 12 and the third magnetic layer 13 while increasing the gap magnetic field by the first current I1 The recording density can be increased easily. For example, a magnetic head and a magnetic recording device can be provided in which the recording density can be increased. The adjustment of the oscillation frequency is easy.

For example, the magnetic head 131 includes the first to third terminals T1 to T3. The third terminal T3 is electrically connected to the conductive layer 21e. The second circuit 20D is electrically connected to the first terminal T1 and the third terminal T3. The first circuit 10D is electrically connected to the second terminal T2 and the third terminal T3.

In the magnetic head 131, the first nonmagnetic layer 21 and the third nonmagnetic layer 23 include, for example, at least one selected from the group consisting of Cu, Ag, Au, Al, and Ti. The second nonmagnetic layer 22 and the fourth nonmagnetic layer 24 include at least one selected from the group consisting of Ta, Pt, Ir, W, Mo, Cr, Tb, Rh, Pd, and Ru. The thicknesses along the first direction D1 of the second nonmagnetic layer 22 and the fourth nonmagnetic layer 24 each are not less than 1 nm and not more than 3 nm. The fifth nonmagnetic layer 25 and the sixth nonmagnetic layer 26 include at least one selected from the group consisting of Cu, Ag, Au, Al, Ti, and Ru. The thicknesses along the first direction D1 of the fifth nonmagnetic layer 25 and the sixth nonmagnetic layer 26 each are not less than 1 nm and not more than 3 nm. At least one of the fifth nonmagnetic layer 25 or the sixth nonmagnetic layer 26 may be provided. For example, the increase of the damping in the first magnetic layer 11 is suppressed. For example, the increase of the damping in the second magnetic layer 12 is suppressed. For example, the operating current density decreases. For example, a long life is obtained.

In the magnetic head 131, for example, the first magnetic layer 11 contacts the first nonmagnetic layer 21 and the fifth nonmagnetic layer 25. The third magnetic layer 13 contacts the fourth nonmagnetic layer 24 and the third nonmagnetic layer 23. The second magnetic layer 12 contacts the third nonmagnetic layer 23 and the sixth nonmagnetic layer 26. The sixth nonmagnetic layer 26 contacts the second magnetic layer 12 and the second nonmagnetic layer 22.

In the magnetic heads 130 and 131, for example, the product of the thickness (the thickness along the first direction D1) of the second magnetic layer 12 and the second saturation magnetic flux density of the second magnetic layer 12 is larger than the product of the thickness (the thickness along the first direction D1) of the third magnetic layer 13 and the third saturation magnetic flux density of the third magnetic layer 13. Thereby, the oscillation occurs easily in the second magnetic layer 12. For example, the product of the volume of the second magnetic layer 12 and the second saturation magnetic flux density of the second magnetic layer 12 is larger than the product of the volume of the third magnetic layer 13 and the third saturation magnetic flux density of the third magnetic layer 13. For example, the thickness of the third magnetic layer 13 is thinner than the thickness of the second magnetic layer 12. Thereby, for example, stable oscillation is obtained in the second magnetic layer 12 and the third magnetic layer 13.

In the magnetic head 130, the distance along the second direction D2 between the second magnetic layer 12 and the first magnetic layer 11 is, for example, not less than ½ of the length along the second direction D2 of the first magnetic layer 11. In the magnetic head 131, the distance along the second direction D2 between the third magnetic layer 13 and the first magnetic layer 11 is, for example, not less than ½ of the length along the second direction D2 of the first magnetic layer 11.

Figure 7:
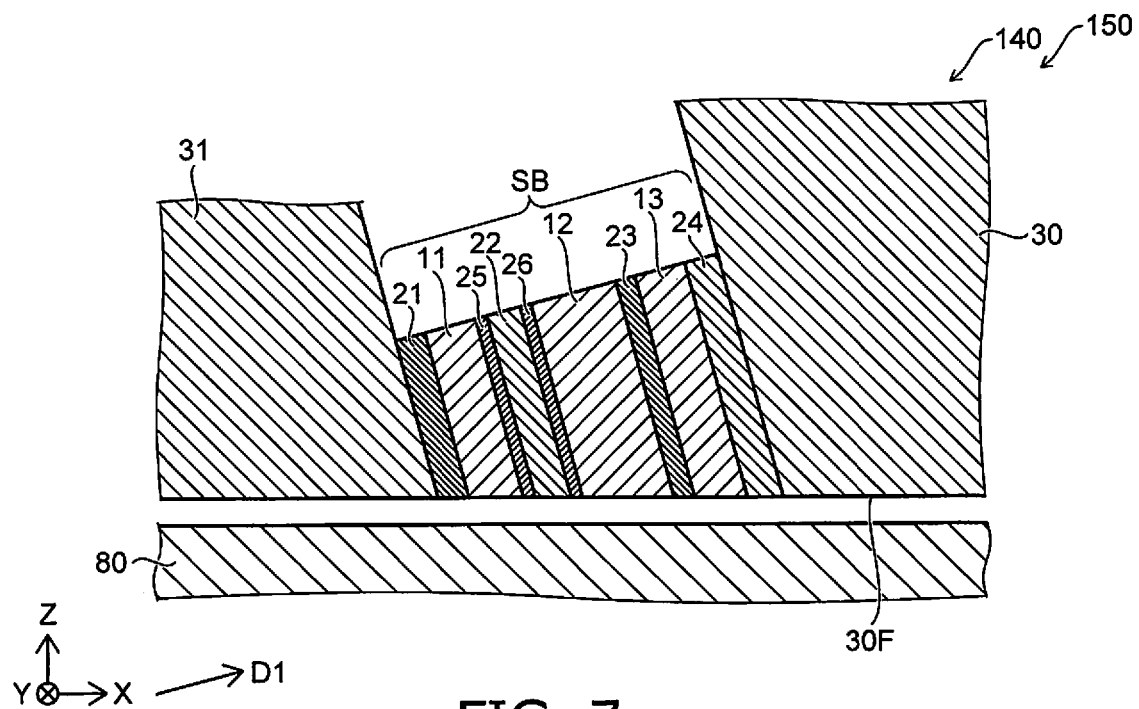
FIG. 7 is a schematic cross-sectional view illustrating the magnetic head and the magnetic recording device according to the embodiment.
Figure 8:
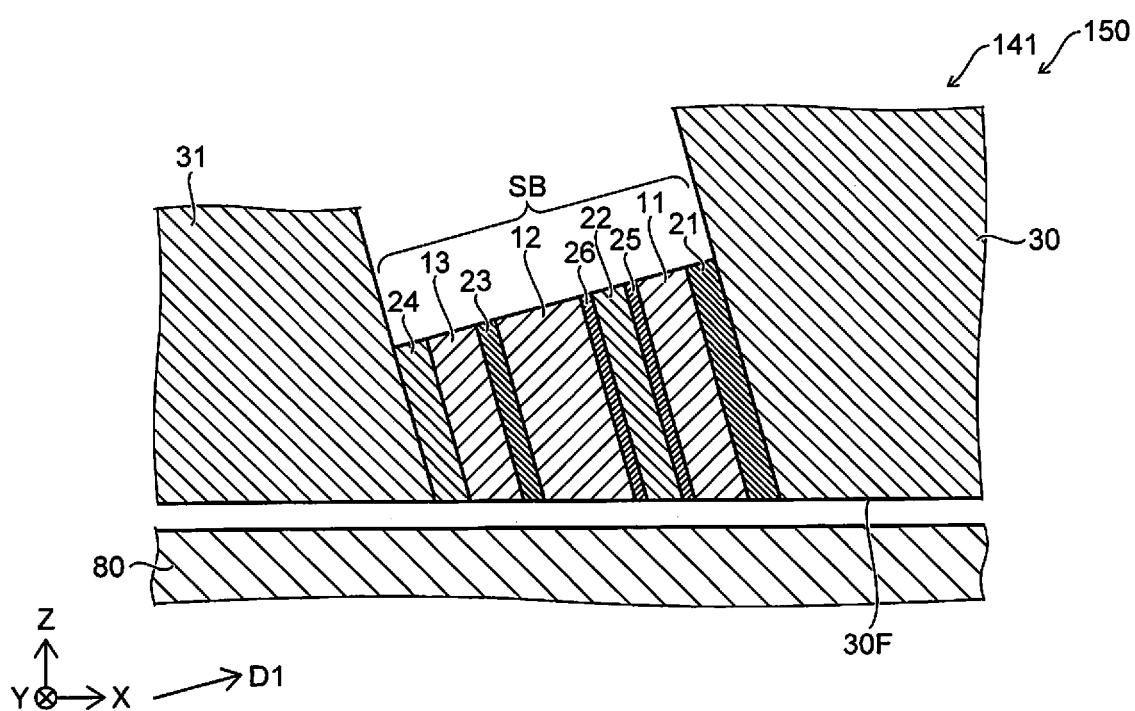
FIG. 8 is a schematic cross-sectional view illustrating the magnetic head and the magnetic recording device according to the embodiment.

FIG. 7 and FIG. 8 are schematic cross-sectional views illustrating the magnetic head and the magnetic recording device according to the embodiment.

As in a magnetic head 140 illustrated in FIG. 7, the stacking direction of the stacked body SB (the first direction D1) may be tilted with respect to a plane (e.g., the X-Y plane) including the medium-opposing surface 30F in the configuration of the magnetic head 110. As in a magnetic head 141 illustrated in FIG. 8, the stacking direction of the stacked body SB may be tilted with respect to a plane (e.g., the X-Y plane) including the medium-opposing surface 30F in the configuration of the magnetic head 111. In the magnetic head 141, the volume of the second magnetic layer 12 is easily set to be larger than the volume of the third magnetic layer 13.

Such a tilt of the stacking direction (the first direction D1) is applicable to any magnetic recording head according to the first to third embodiments.

In the embodiment, the magnetic pole 30 includes, for example, an FeCo alloy, an FeCoNi alloy, etc.

The shield 31 includes, for example, an FeCo alloy, an FeCoNi alloy, etc.

At least one of the second magnetic layer 12 or the third magnetic layer 13 includes, for example, at least one of an FeCo alloy, a Heusler alloy, a [Fe/Co] artificial lattice, a [FeCoNi/Ni] artificial lattice, or a [Co/Pt] artificial lattice. At least one of the first magnetic layer 11 or the second magnetic layer 12 may include a stacked film including at least two of an FeCo alloy film, a Heusler alloy film, a [Fe/Co] artificial lattice film, a [FeCoNi/Ni] artificial lattice film, or a [Co/Pt] artificial lattice film.

The magnetic recording medium 80 includes, for example, a CoCrPt—$SiO_2$ granular film.

The magnetic head according to the embodiment may perform shingled recording or interlaced recording to the magnetic recording medium 80. The recording density can be increased further.

An example of a magnetic recording device according to the embodiment will now be described.

Figure 9:
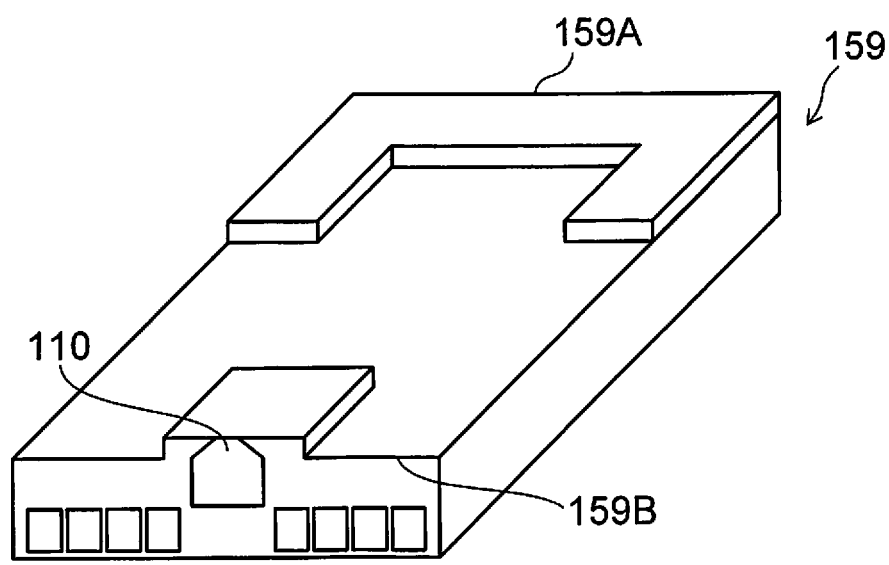
FIG. 9 is a schematic perspective view illustrating a portion of the magnetic recording device according to the embodiment.

FIG. 9 is a schematic perspective view illustrating a portion of the magnetic recording device according to the embodiment.

FIG. 9 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 10:
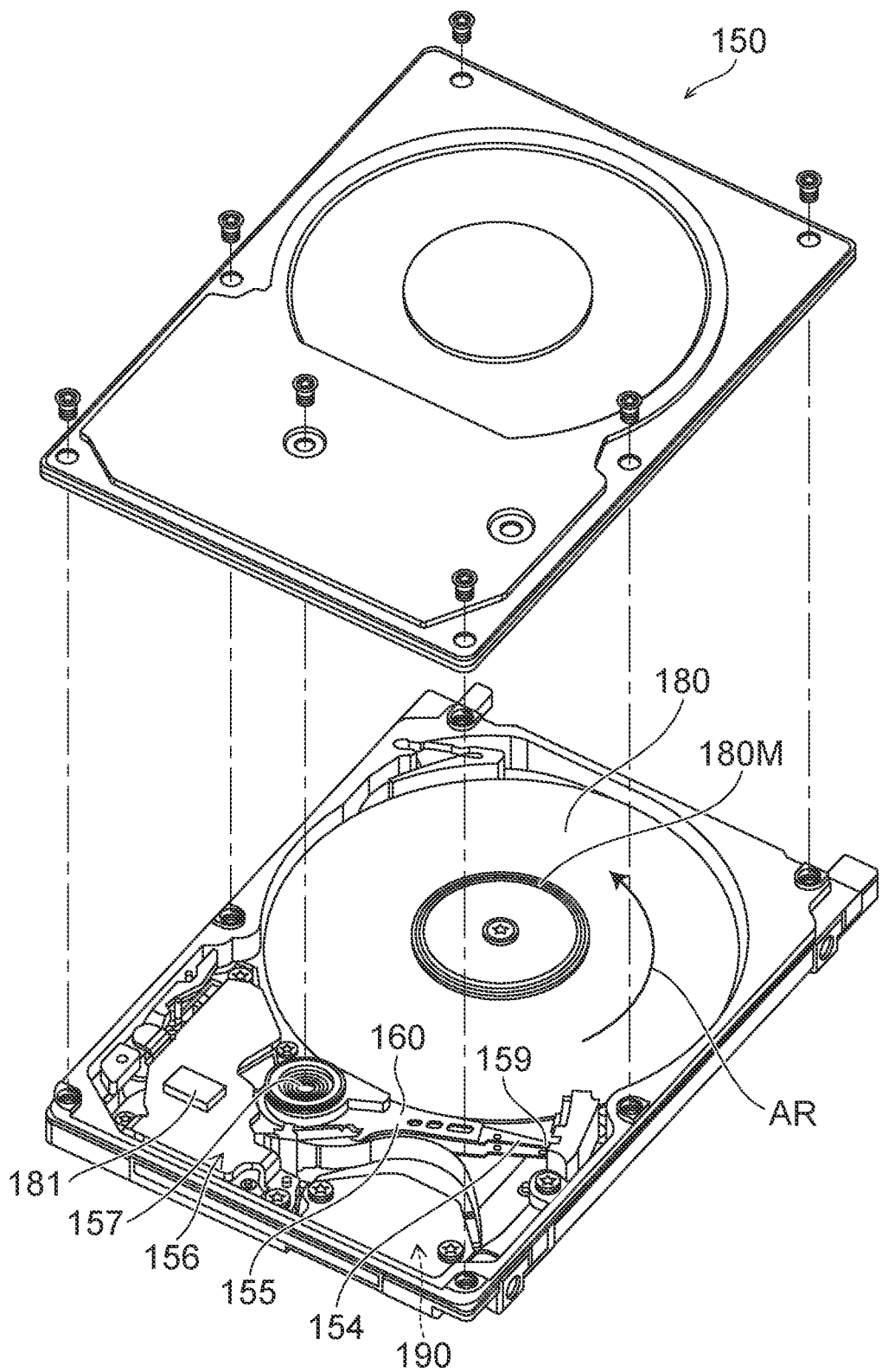
FIG. 10 is a schematic perspective view illustrating the magnetic recording device according to the embodiment.

FIG. 10 is a schematic perspective view illustrating the magnetic recording device according to the embodiment.

As shown in FIG. 10, a rotary actuator is used in the magnetic recording device 150 according to the embodiment. A recording medium disk 180 is provided in a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 11A:
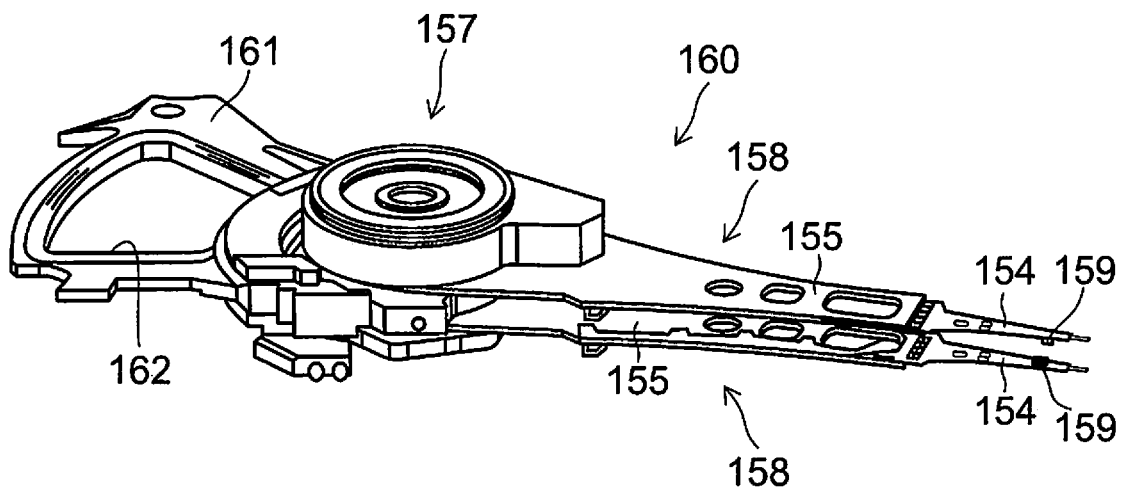
FIG. 11A and FIG. 11B are schematic perspective views illustrating a portion of the magnetic recording device according to the embodiment.
Figure 11B:
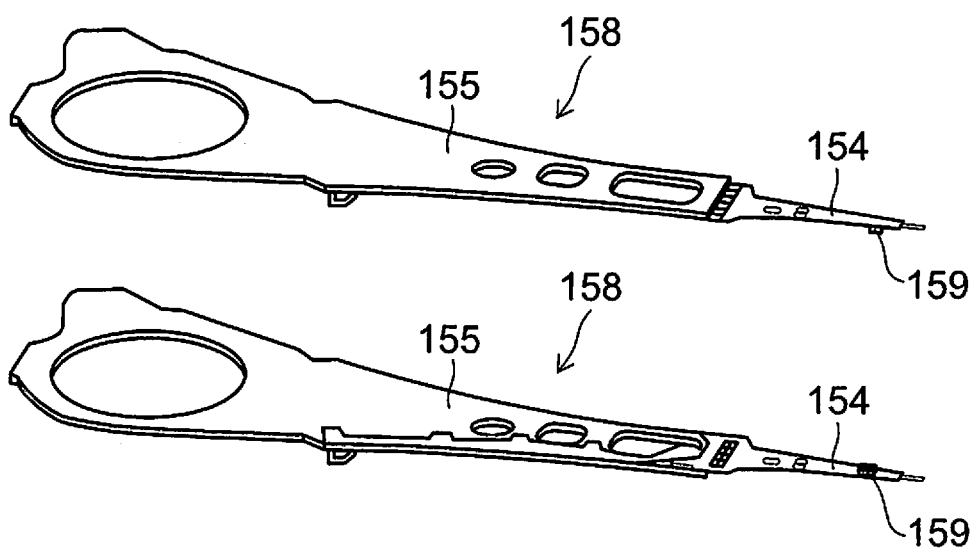

FIG. 11A and FIG. 11B are schematic perspective views illustrating a portion of the magnetic recording device according to the embodiment.

FIG. 11A illustrates the configuration of a portion of the magnetic recording device and is an enlarged perspective view of a head stack assembly 160. FIG. 11B is a perspective view illustrating a magnetic head assembly (a head gimbal assembly (HGA)) 158 that is a portion of the head stack assembly 160.

As shown in FIG. 11A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 11B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head, at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording device 150 according to the embodiment includes a magnetic recording medium, the magnetic head assembly according to the embodiment, and a signal processor that records and reproduces the signals to and from the magnetic recording medium by using the magnetic head provided in the magnetic head assembly.

The embodiments may include the following configurations (e.g., technological proposals).

Configuration 1

A magnetic head, comprising:
a shield;
a magnetic pole;
a first magnetic layer provided between the shield and the magnetic pole;
a second magnetic layer provided between the first magnetic layer and the magnetic pole;
a third magnetic layer provided between the second magnetic layer and the magnetic pole;
a first nonmagnetic layer provided between the shield and the first magnetic layer;
a second nonmagnetic layer provided between the first magnetic layer and the second magnetic layer;
a third nonmagnetic layer provided between the second magnetic layer and the third magnetic layer; and
a fourth nonmagnetic layer provided between the third magnetic layer and the magnetic pole,
the first nonmagnetic layer and the third nonmagnetic layer including at least one selected from the group consisting of Cu, Ag, Au, Al, and Ti,
the second nonmagnetic layer and the fourth nonmagnetic layer including at least one selected from the group consisting of Ta, Pt, Ir, W, Mo, Cr, Tb, Rh, Pd, and Ru,
thicknesses along a first direction of the second nonmagnetic layer and the fourth nonmagnetic layer each being not less than 1 nm and not more than 3 nm, the first direction being from the shield toward the magnetic pole.

Configuration 2

The magnetic head according to Configuration 1, wherein a first current having an orientation from the first nonmagnetic layer toward the fourth nonmagnetic layer flows.

Configuration 3

A magnetic head, comprising:
a shield;
a magnetic pole;
a first magnetic layer provided between the shield and the magnetic pole;
a second magnetic layer provided between the shield and the first magnetic layer;
a third magnetic layer provided between the shield and the second magnetic layer;
a first nonmagnetic layer provided between the first magnetic layer and the magnetic pole;
a second nonmagnetic layer provided between the second magnetic layer and the first nonmagnetic layer;

a third nonmagnetic layer provided between the third magnetic layer and the second nonmagnetic layer; and a fourth nonmagnetic layer provided between the shield and the third magnetic layer, the first nonmagnetic layer and the third nonmagnetic. layer including at least one selected from the group consisting of Cu, Ag, Au, Al, and Ti, the second nonmagnetic layer and the fourth nonmagnetic layer including at least one selected from the group consisting of Ta, Pt, Ir, W, Mo, Cr, Tb, Rh, Pd, and Ru, thicknesses along a first direction of the second nonmagnetic layer and the fourth nonmagnetic layer each being not less than 1 nm and not more than 3 nm, the first direction being from the shield toward the magnetic pole.

Configuration 4

The magnetic head according to Configuration 3, wherein a first current having an orientation from the first nonmagnetic layer toward the fourth nonmagnetic layer flows.

Configuration 5

The magnetic head according to any one of Configurations 1 to 4, further comprising:

a fifth nonmagnetic layer provided between the second nonmagnetic layer and the first magnetic layer; and a sixth nonmagnetic layer provided between the second magnetic layer and the second nonmagnetic layer, the fifth nonmagnetic layer and the sixth nonmagnetic layer including at least one selected from the group consisting of Cu, Ag, Au, Al, Ti, and Ru, thicknesses along the first direction of the fifth nonmagnetic layer and the sixth nonmagnetic layer each being not less than 1 nm and not more than 3 nm.

Configuration 6

A magnetic head, comprising:

a shield;

a magnetic pole having a medium-opposing surface, a first direction from the shield toward the magnetic pole being along the medium-opposing surface;

a first magnetic layer, a position in the first direction of the first magnetic layer being between a position in the first direction of the shield and a position in the first direction of the magnetic pole;

a second magnetic layer provided between the shield and the magnetic pole, a position of the second magnetic layer in a second direction being between a position in the second direction of the first magnetic layer and a position in the second direction of a plane including the medium-opposing surface, the second direction crossing the medium-opposing surface;

a third magnetic layer provided between the second magnetic layer and the magnetic pole;

a first nonmagnetic layer provided between the first magnetic layer and the magnetic pole;

a second nonmagnetic layer provided between the shield and the second magnetic layer;

a third nonmagnetic layer provided between the second magnetic layer and the third magnetic layer;

a fourth nonmagnetic layer provided between the third magnetic layer and the magnetic pole;

a fifth nonmagnetic layer, the first magnetic layer being provided between the fifth nonmagnetic layer and the first nonmagnetic layer; and a sixth nonmagnetic layer provided between the second nonmagnetic layer and the second magnetic layer.

Configuration 7

A magnetic head, comprising:

a shield;

a magnetic pole having a medium-opposing surface, a first direction from the shield toward the magnetic pole being along the medium-opposing surface;

a first magnetic layer, a position in the first direction of the first magnetic layer being between a position in the first direction of the shield and a position in the first direction of the magnetic pole, a second magnetic layer provided between the shield and the magnetic pole, a position of the second magnetic layer in a second direction being between a position in the second direction of the first magnetic layer and a position in the second direction of a plane including the medium-opposing surface, the second direction crossing the medium-opposing surface;

a third magnetic layer provided between the shield and the second magnetic layer;

a first nonmagnetic layer provided between the first magnetic layer and the magnetic pole;

a second nonmagnetic layer provided between the second magnetic layer and the magnetic pole;

a third nonmagnetic layer provided between the third magnetic layer and the second magnetic layer;

a fourth nonmagnetic layer provided between the shield and the third magnetic layer;

a fifth nonmagnetic layer, the first magnetic layer being provided between the fifth nonmagnetic layer and the first nonmagnetic layer; and a sixth nonmagnetic layer provided between the second magnetic layer and the second nonmagnetic layer.

Configuration 8

The magnetic head according to Configuration 6 or 7, wherein the first nonmagnetic layer and the third nonmagnetic layer include at least one selected from the group consisting of Cu, Ag, Au, Al, and Ti, the second nonmagnetic layer and the fourth nonmagnetic layer include at least one selected from the group consisting of Ta, Pt, Ir, W, Mo, Cr, Tb, Rh, Pd, and Ru, thicknesses along a first direction of the second nonmagnetic layer and the fourth nonmagnetic layer each are not less than 1 nm and not more than 3 nm, the first direction being from the shield toward the magnetic pole, the fifth nonmagnetic layer and the sixth nonmagnetic layer include at least one selected from the group consisting of Cu, Ag, Au, Al, Ti, and Ru, and thicknesses along the first direction of the fifth nonmagnetic layer and the sixth nonmagnetic layer each are not less than 1 nm and not more than 3 nm.

Configuration 9

The magnetic head according to any one of Configurations 1 to 8, wherein a product of a second thickness along the first direction of the second magnetic layer and a second saturation magnetic flux density of the second magnetic layer is larger than a product of a third thickness along the first direction of the third magnetic layer and a third saturation magnetic flux density of the third magnetic layer.

Configuration 10

The magnetic head according to any one of Configurations 1 to 9, wherein a product of a volume of the second magnetic layer and a second saturation magnetic flux density of the second magnetic layer is larger than a product of a volume of the third magnetic layer and a third saturation magnetic flux density of the third magnetic layer.

Configuration 11
  A magnetic recording device, comprising:
  the magnetic head according to any one of Configurations 6 to 8; and
  a circuit portion,
  the circuit portion including
    a first circuit configured to supply a first current having an orientation from the first magnetic layer toward the first nonmagnetic layer, and
    a second circuit configured to supply a second current having an orientation from the second nonmagnetic layer toward the fourth nonmagnetic layer,
  the circuit portion being configured to control the first current and the second current independently from each other.

Configuration 12
  A magnetic recording device, comprising:
  a shield;
  a magnetic pole;
  a first magnetic layer provided between the shield and the magnetic pole;
  a second magnetic layer provided between the first magnetic layer and the magnetic pole;
  a third magnetic layer provided between the second magnetic layer and the magnetic pole;
  a first nonmagnetic layer provided between the shield and the first magnetic layer;
  a second nonmagnetic layer provided between the first magnetic layer and the second magnetic layer;
  a third nonmagnetic layer provided between the second magnetic layer and the third magnetic layer;
  a fourth nonmagnetic layer provided between the third magnetic layer and the magnetic pole; and
  a circuit portion including a first circuit and a second circuit, the first circuit being configured to supply a first current having an orientation from the first nonmagnetic layer toward the second nonmagnetic layer, the second circuit being configured to supply a second current having an orientation from the second nonmagnetic layer toward the fourth nonmagnetic layer,
  the circuit portion being configured to control the first current and the second current independently from each other.

Configuration 13
  The magnetic recording device according to Configuration 12, further comprising:
  a fifth nonmagnetic layer provided between the first magnetic layer and the second nonmagnetic layer; and
  a sixth nonmagnetic layer provided between the second nonmagnetic layer and the second magnetic layer,
  the fifth nonmagnetic layer and the sixth nonmagnetic layer including at least one selected from the group consisting of Cu, Ag, Au, Al, Ti, and Ru.
  thicknesses along the first direction of the fifth nonmagnetic layer and the sixth nonmagnetic layer each being not less than 1 nm and not more than 3 nm.

Configuration 14
  A magnetic recording device, comprising:
  a shield;
  a magnetic pole;
  a first magnetic layer provided between the shield and the magnetic pole;
  a second magnetic layer provided between the first magnetic layer and the magnetic pole;
  a third magnetic layer provided between the first magnetic layer and the second magnetic layer;
  a first nonmagnetic layer provided between the shield and the first magnetic layer;
  a second nonmagnetic layer provided between the first magnetic layer and the third magnetic layer;
  a third nonmagnetic layer provided between the third magnetic layer and the second magnetic layer;
  a fourth nonmagnetic layer provided between the second magnetic layer and the magnetic pole; and
  a circuit portion including a first circuit and a second circuit, the first circuit being configured to supply a first current having an orientation from the first nonmagnetic layer toward the second nonmagnetic layer, the second circuit being configured to supply a second current having an orientation from the fourth nonmagnetic layer toward the second nonmagnetic layer,
  the circuit portion being configured to control the first current and the second current independently from each other.

Configuration 15
  The magnetic recording device according to Configuration 14, further comprising:
  a fifth nonmagnetic layer provided between the first magnetic layer and the second nonmagnetic layer; and
  a sixth nonmagnetic layer provided between the second nonmagnetic layer and the third magnetic layer,
  the fifth nonmagnetic layer and the sixth nonmagnetic layer including at least one selected from the group consisting of Cu, Ag, Au, Al, Ti, and Ru,
  thicknesses along the first direction of the fifth nonmagnetic layer and the sixth nonmagnetic layer each being not less than 1 nm and not more than 3 nm.

Configuration 16
  The magnetic recording device according to any one of Configurations 12 to 15, wherein
  the first nonmagnetic layer and the third nonmagnetic layer include at least one selected from the group consisting of Cu, Ag, Au, Al, and Ti,
  the second nonmagnetic layer and the fourth nonmagnetic layer include at least one selected from the group consisting of Ta, Pt, Ir, W, Mo, Cr, Tb, Rh, Pd, and Ru, and
  thicknesses along a first direction of the second nonmagnetic layer and the fourth nonmagnetic layer each are not less than 1 nm and not more than 3 nm, the first direction being from the shield toward the magnetic pole.

Configuration 17
  The magnetic recording device according to any one of Configurations 12 to 16, wherein a product of a second thickness along the first direction of the second magnetic layer and a second saturation magnetic flux density of the second magnetic layer is larger than a product of a third thickness along the first direction of the third magnetic layer and a third saturation magnetic flux density of the third magnetic layer.

Configuration 18
  The magnetic recording device according to any one of Configurations 12 to 17, wherein a product of a volume of the second magnetic layer and a second saturation magnetic flux density of the second magnetic layer is larger than a product of a volume of the third magnetic layer and a third saturation magnetic flux density of the third magnetic layer.

Configuration 19
  The magnetic recording device according to any one of Configurations 12 to 18, wherein the first magnetic layer includes at least one selected from the group consisting of FeNi and CoFe.

Configuration 20

The magnetic recording device according to any one of Configurations 12 to 19, further comprising a third circuit, the magnetic head further including a coil, the third circuit supplying a recording current to the coil.

Configuration 21

The magnetic head according to any one of Configurations 1 to 10, wherein a thickness of the second magnetic layer is thinner than a thickness of the third magnetic layer.

Configuration 22

The magnetic recording device according to any one of Configurations 12 to 20, wherein a thickness of the second magnetic layer is thinner than a thickness of the third magnetic layer.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, shields, magnetic layers, conductive layers, insulating layers, interconnections, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices, and magnetic heads practicable by an appropriate design modification by one skilled in the art based on the magnetic recording devices, and the magnetic heads described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
   a shield;
   a magnetic pole;
   a first magnetic layer provided between the shield and the magnetic pole;
   a second magnetic layer provided between the first magnetic layer and the magnetic pole;
   a third magnetic layer provided between the second magnetic layer and the magnetic pole;
   a first nonmagnetic layer provided between the shield and the first magnetic layer;
   a second nonmagnetic layer provided between the first magnetic layer and the second magnetic layer;
   a third nonmagnetic layer provided between the second magnetic layer and the third magnetic layer; and
   a fourth nonmagnetic layer provided between the third magnetic layer and the magnetic pole,
   the first nonmagnetic layer and the third nonmagnetic layer including at least one selected from the group consisting of Cu, Ag, Au, Al, and Ti,
   the second nonmagnetic layer and the fourth nonmagnetic layer including at least one selected from the group consisting of Ta, Pt, Ir, W, Mo, Cr, Tb, Rh, Pd, and Ru,
   thicknesses along a first direction of the second nonmagnetic layer and the fourth nonmagnetic layer each being not less than 1 nm and not more than 3 nm, the first direction being from the shield toward the magnetic pole,
   wherein a first current having an orientation from the first nonmagnetic layer toward the fourth nonmagnetic layer flows, the orientation of the first current being opposite to an orientation of an electron flow.

2. The magnetic head according to claim 1, further comprising:
   a fifth nonmagnetic layer provided between the second nonmagnetic layer and the first magnetic layer; and
   a sixth nonmagnetic layer provided between the second magnetic layer and the second nonmagnetic layer,
   the fifth nonmagnetic layer and the sixth nonmagnetic layer including at least one selected from the group consisting of Cu, Ag, Au, Al, Ti, and Ru,
   thicknesses along the first direction of the fifth nonmagnetic layer and the sixth nonmagnetic layer each being not less than 1 nm and not more than 3 nm.

3. A magnetic head, comprising:
   a shield;
   a magnetic pole;
   a first magnetic layer provided between the shield and the magnetic pole;
   a second magnetic layer provided between the first magnetic layer and the magnetic pole;
   a third magnetic layer provided between the second magnetic layer and the magnetic pole;
   a first nonmagnetic layer provided between the shield and the first magnetic layer;
   a second nonmagnetic layer provided between the first magnetic layer and the second magnetic layer;
   a third nonmagnetic layer provided between the second magnetic layer and the third magnetic layer;
   a fourth nonmagnetic layer provided between the third magnetic layer and the magnetic pole;
   a fifth nonmagnetic layer; and
   a sixth nonmagnetic layer,
   the first nonmagnetic layer and the third nonmagnetic layer including at least one selected from the group consisting of Cu, Ag, Au, Al, and Ti,
   the second nonmagnetic layer and the fourth nonmagnetic layer including at least one selected from the group consisting of Ta, Pt, Ir, W, Mo, Cr, Tb, Rh, Pd, and Ru,
   thicknesses along a first direction of the second nonmagnetic layer and the fourth nonmagnetic layer each being not less than 1 nm and not more than 3 nm, the first direction being from the shield toward the magnetic pole, the fifth nonmagnetic layer being provided between the second nonmagnetic layer and the first magnetic layer, the sixth nonmagnetic layer being provided between the second magnetic layer and the second nonmagnetic layer, the fifth nonmagnetic layer and the sixth nonmagnetic layer including at least one selected from the group consisting of Cu, Ag, Au, Al, Ti, and Ru, thicknesses along the first direction of the fifth nonmagnetic layer and the sixth nonmagnetic layer each being not less than 1 nm and not more than 3 nm.

4. The magnetic head according to claim 3, wherein a first current having an orientation from the first nonmagnetic layer toward the fourth nonmagnetic layer flows.

5. The magnetic head according to claim 3, wherein a product of a second thickness along the first direction of the second magnetic layer and a second saturation magnetic flux density of the second magnetic layer is larger than a product of a third thickness along the first direction of the third magnetic layer and a third saturation magnetic flux density of the third magnetic layer.

6. The magnetic head according to claim 3, wherein a product of a volume of the second magnetic layer and a second saturation magnetic flux density of the second magnetic layer is larger than a product of a volume of the third magnetic layer and a third saturation magnetic flux density of the third magnetic layer.

7. A magnetic recording device, comprising:
a magnetic head; and
a circuit portion,
the magnetic head, comprising:
a shield;
a magnetic pole;
a first magnetic layer provided between the shield and the magnetic pole;
a second magnetic layer provided between the first magnetic layer and the magnetic pole;
a third magnetic layer provided between the second magnetic layer and the magnetic pole;
a first nonmagnetic layer provided between the shield and the first magnetic layer;
a second nonmagnetic layer provided between the first magnetic layer and the second magnetic layer;
a third nonmagnetic layer provided between the second magnetic layer and the third magnetic layer; and
a fourth nonmagnetic layer provided between the third magnetic layer and the magnetic pole,
the first nonmagnetic layer and the third nonmagnetic layer including at least one selected from the group consisting of Cu, Ag, Au, Al, and Ti,
the second nonmagnetic layer and the fourth nonmagnetic layer including at least one selected from the group consisting of Ta, Pt, Ir, W, Mo, Cr, Tb, Rh, Pd, and Ru,
thicknesses along a first direction of the second nonmagnetic layer and the fourth nonmagnetic layer each being not less than 1 nm and not more than 3 nm, the first direction being from the shield toward the magnetic pole,
the circuit portion being configured to supply a first current having an orientation from the first nonmagnetic layer toward the fourth nonmagnetic layer, the orientation of the first current being opposite to an orientation of an electron flow.

* * * * *